United States Patent
Chattopadhyay

(10) Patent No.: US 12,092,789 B2
(45) Date of Patent: Sep. 17, 2024

(54) CALCULATING A RETURN PERIOD WIND SPEED

(71) Applicant: VESTAS WIND SYSTEMS A/S, Aarhus N. (DK)

(72) Inventor: Sayantan Chattopadhyay, Chennai (IN)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 205 days.

(21) Appl. No.: 17/789,452

(22) PCT Filed: Dec. 16, 2020

(86) PCT No.: PCT/DK2020/050366
§ 371 (c)(1),
(2) Date: Jun. 27, 2022

(87) PCT Pub. No.: WO2021/129909
PCT Pub. Date: Jul. 1, 2021

(65) Prior Publication Data
US 2023/0042981 A1 Feb. 9, 2023

(30) Foreign Application Priority Data
Dec. 26, 2019 (IN) .............................. 201911053889

(51) Int. Cl.
*G01W 1/10* (2006.01)
(52) U.S. Cl.
CPC .................................... *G01W 1/10* (2013.01)

(58) Field of Classification Search
CPC ....................................................... G01W 1/10
See application file for complete search history.

(56) References Cited

U.S. PATENT DOCUMENTS

| 6,320,272 B1 * | 11/2001 | Lading ................. F03D 7/0224 290/55 |
| 2006/0173623 A1 | 8/2006 | Grzych et al. |
| 2013/0073223 A1 | 3/2013 | Lapira et al. |
| 2013/0317748 A1 | 11/2013 | Obrecht et al. |

(Continued)

FOREIGN PATENT DOCUMENTS

| CN | 106772695 A | * 5/2017 | |
| EP | 2667022 A2 | * 11/2013 | ............. F03D 7/048 |

(Continued)

OTHER PUBLICATIONS

European Patent Office, Communication pursuant to Article 94(3) EPC for Application 20 828 279.8-1001 dated Nov. 7, 2023.

(Continued)

Primary Examiner — Yoshihisa Ishizuka
(74) Attorney, Agent, or Firm — Patterson + Sheridan, LLP

(57) ABSTRACT

A method of calculating a return period wind speed for a proposed wind turbine site is provided. Wind speed measurements and modeled wind speeds associated with the proposed site are provided. The measured and modeled wind speeds are transformed into the frequency domain, and combined to generate a hybrid spectrum. The hybrid spectrum is transformed into the time domain to generate a set of hybrid wind speed measurements, which are used to calculate the return period wind speed.

17 Claims, 4 Drawing Sheets

(56) References Cited

U.S. PATENT DOCUMENTS

2015/0145253 A1    5/2015  Bayon et al.
2015/0278405 A1*  10/2015  Andersen ......... G06Q 10/06375
                                                703/18

FOREIGN PATENT DOCUMENTS

WO      2011143531  A2    11/2011
WO      2021129909  A1     7/2021

OTHER PUBLICATIONS

Chinese Patent Office, First Office Action for Chinese Patent Application No. 202080087170.1, dated Jan. 12, 2024.
Palutikof J. P.: "A review of methods to calculate extreme wind speeds," Meteorol. Appl. vol. 6, No. 2, Jun. 1, 1999, pp. 119-132.
PCT, Notification of Transmittal of The International Search Report and The Written Opinion of The International Searching Authority, or The Declaration for Application PCT/DK2020/050366 dated Mar. 24, 2021.

* cited by examiner

CALCULATING A RETURN PERIOD WIND SPEED

FIELD OF THE INVENTION

The present invention relates to a method for calculating a return period wind speed at a proposed wind turbine site.

BACKGROUND OF THE INVENTION

It is important when designing and siting a wind turbine to understand the conditions that the wind turbine may face during its lifetime. Wind turbines are expected to have lifetimes of 20-25 years, and so information about likely weather conditions over a long period of time are needed.

Generally, local weather measurements for the proposed wind turbine site are not available for such long time scales. Instead, short term local measurements (e.g. measured over a year) are used to estimate an extreme wind speed that the proposed site will experience during a return period. Most commonly, a 50 year extreme wind speed is calculated—i.e. the extreme wind speed with a recurrence period of 50 years. For example, a Gumbel calculation may be performed, as detailed in IEC standard 61400-1.

Such calculations are based on very limited data sets, and so may not provide an accurate estimation of the extreme wind speed.

SUMMARY OF THE INVENTION

A first aspect of the invention provides a method of calculating a return period wind speed for a proposed wind turbine site, the method comprising:
  providing wind speed measurements associated with the proposed wind turbine site, the wind speed measurements measured during a measurement period;
  transforming the wind speed measurements into a frequency domain to generate a measured wind speed spectrum;
  providing modeled wind speeds, wherein the modeled wind speeds are estimates of wind speeds at the proposed wind turbine site during an extended period, the extended period longer than the measurement period;
  transforming the modeled wind speeds into the frequency domain to generate a modeled wind speed spectrum;
  combining the measured wind speed spectrum and the modeled wind speed spectrum to generate a hybrid spectrum;
  transforming the hybrid spectrum from the frequency domain into a time domain to provide hybrid wind speed measurements; and
  calculating the return period wind speed using the hybrid wind speed measurements.

In some embodiments, the extended period may encompass the measurement period.

In some embodiments, combining the measured wind speed spectrum and the modeled wind speed spectrum may comprise:
  extracting a portion of the modeled wind speed spectrum with frequencies up to a cut-out frequency; and
  extracting a portion of the measured wind speed spectrum with frequencies above the cut-out frequency; and
  combining the portion of the modeled wind speed spectrum with the portion of the measured wind speed spectrum to generate the hybrid spectrum.

In some such embodiments, the cut-out frequency may be a predetermined value.

In some embodiments, calculating return period wind speed using the hybrid wind measurements may comprise:
  scaling the hybrid wind speed measurements based on a statistical deviation of the wind speed measurements to generate scaled hybrid wind speed measurements; and
  calculating the return period wind speed using the scaled hybrid wind speed measurements.

In some embodiments, transforming the hybrid spectrum from the frequency domain into the time domain may be based on a random phase value; and wherein the method comprises:
  generating a plurality of sets of hybrid wind speed measurements, each set of hybrid wind speed measurements based on a different random phase value:
  calculating a return period wind speed for each set of hybrid wind speed measurements in the plurality of sets of hybrid wind measurements: and
  averaging the calculated return period wind speeds.

In some embodiments, transforming the wind speed measurements and/or modeled wind speeds into the frequency domain may comprise calculating a power spectral density of the wind speed measurements and/or modeled wind speeds.

In some embodiments, the wind speed measurements may be measured at a mast height. The modeled wind speeds may be estimates of wind speeds at the mast height.

In some embodiments, the measurement period may be between 6 months and 2 years. The extended period may be between 10 years and 30 years. The return period of the return period wind speed may be between 30 years and 75 years.

In some embodiments, providing the wind speed measurements may comprise measuring the wind speed at the proposed wind turbine site using one or more wind speed sensors.

In some embodiments, the modeled wind speeds may be generated using a mesoscale model.

In some embodiments, calculating the return period wind speed may comprise applying a Gumbel calculation to the hybrid wind speed measurements.

In some embodiments, the method may further comprise altering a design parameter of a wind turbine to be built at the proposed wind turbine site based on the calculated wind speed associated with the return period. Some embodiments may further comprise building a wind turbine in accordance with the design parameter.

A second aspect of the invention provides a method of designing a wind turbine, the method comprising:
  selecting a proposed wind turbine site at which the wind turbine is to be located;
  using one or more wind speed sensors, measuring wind speeds associated with the proposed wind turbine site during a measurement period;
  applying the method of any embodiment of the first aspect to calculate a wind speed associated with a return period for the proposed wind turbine; and
  altering a design parameter of the wind turbine based on the wind speed associated with the return period.

The method may further comprise constructing a wind turbine according to the design parameter.

A third aspect of the invention provides a method of constructing a wind turbine, the method comprising:
  selecting a proposed wind turbine site at which the wind turbine is to be located;
  using one or more wind speed sensors, measuring wind speeds at the proposed wind turbine site during a measurement period;

applying the method of any embodiment of the first aspect to calculate a wind speed associated with a return period for the proposed wind turbine;

altering a design parameter of the wind turbine based on the wind speed associated with the return period; and constructing a wind turbine based on the design parameter.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
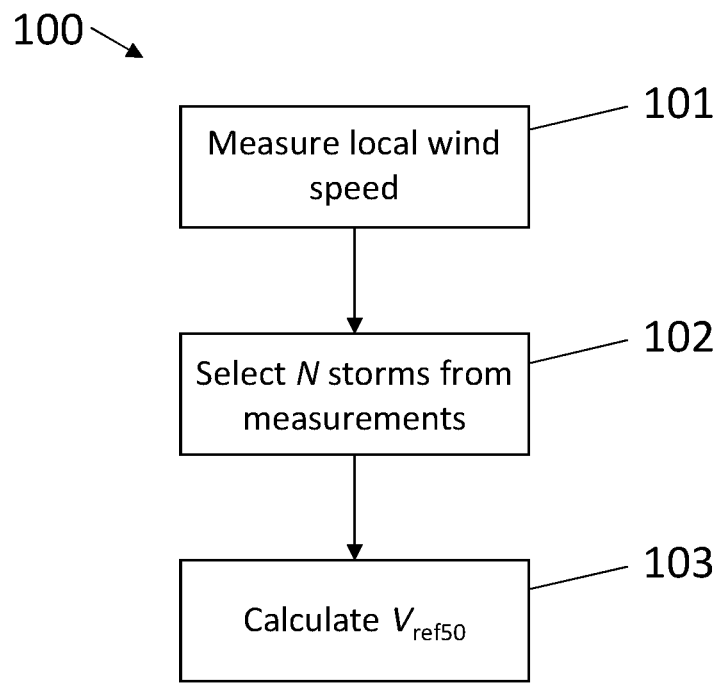
FIG. 1 illustrates a conventional method of calculating a 50 year extreme wind speed at a proposed wind turbine site.

FIG. 1 illustrates conventional method 100 for determining an extreme wind speed associated with a return period—referred to herein as a return period wind speed—at a proposed wind turbine site. In this case, a 50-year return period is calculated. Such a method may be used to estimate the extreme wind speeds that a wind turbine may face if constructed at that site. This information can be used to inform decisions about siting and construction of wind turbines.

Method 100 starts at step 101, where meteorological observations are taken at the local site over a time period T. T may typically be one year or less. During this period, the site will experience a number of storms, each storm typified by higher than average wind speeds. These storms can be identified in the meteorological observations.

At step 102, a first set of N of storms having the strongest maximum wind speeds of the storms identified in the meteorological observations are selected. The maximum wind speed of each selected storm is then used in step 103 to calculate the 50 year extreme wind speed, $V_{ref50}$, using the Gumbel method. The Gumbel method is defined in the International Electrotechnical Commission (IEC) Standard 61400-1 (section 6.3.2.1).

The calculated $V_{ref50}$ is then used as an indication of the maximum wind speed that a turbine built at the site is likely to experience in its lifetime.

The conventional method 100 therefore uses data taken over one year or less, and extrapolates to a 50 year period. This large discrepancy between the measured data length and the forecast length can mean the resulting $V_{ref50}$ is not an accurate reflection of the wind speeds a wind turbine may face. It has been found that the actual winds experienced by a wind turbine may be 15% or more different from the 50 year extreme wind speed calculated by conventional methods. A wind turbine built on the basis of such a $V_{ref50}$ measurement may not be sufficiently configured for the local weather conditions over its lifetime.

The present invention provides an alternative method of calculating a return period wind speed, such as a 50 year extreme wind speed. The method uses a model to provide modeled wind speeds for a proposed wind turbine site. The model can provide data over a longer period than the local measurements used in the conventional method, reducing the discrepancy between the data period and the forecast period.

In embodiments discussed below, a mesoscale model is used to provide the modeled wind speeds. The mesoscale model may particularly be derived using a numerical model of the atmosphere. This model is a software program which numerically solves an equation system describing the atmosphere. The model is specifically set up to resolve the weather features at the mesoscale (i.e. 2-200 km). The precision and accuracy of the model output is sufficient to be used in the context of extreme event analysis. The data may cover a period of 15 years or more (for example starting in the year 2000). The model may for example provide data points with a spacing of a 2-5 km, and with a time frequency of one hour, or less. The mesoscale model may be created using data derived from global measurements, or otherwise non-local sensors. The mesoscale model is thus based on post-processed real atmospheric data, but the data is obtained using weather observations that are not specific to the proposed wind turbine site.

The method of the present invention allows an extended data set to be used to calculate the return period wind speed, and may provide a more accurate estimate of the extreme conditions a wind turbine is likely to face than conventional methods. In particular, the blending of the measured local data with the modeled wind speeds from the mesoscale data set provides locally accurate wind speed estimates, without having to make measurements at the proposed site for the full extended period.

Figure 2:
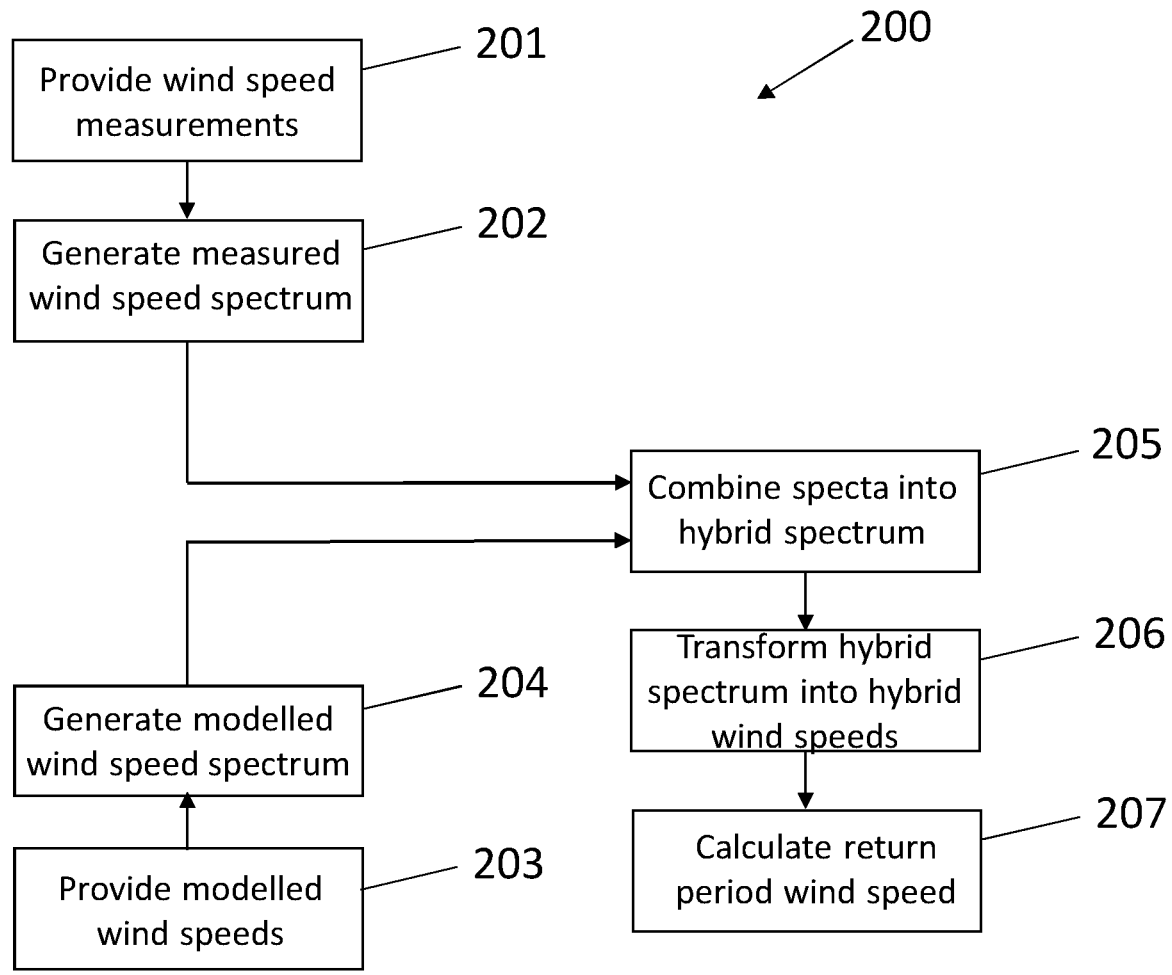
FIG. 2 illustrates a method according to the present invention of calculating an extreme wind speed associated with a return period at a proposed wind turbine site.

FIG. 2 illustrates a method 200 of calculating a wind speed associated with a return period at a proposed wind turbine site according to the present invention. In this method, measured and modeled wind speeds are combined in the frequency domain, before transforming back to the time domain to provide a set of hybrid wind speeds.

The hybrid wind speeds benefit from the high sampling rate of real world wind speed measurements, and the long duration of the modeled data set. The hybrid wind speeds can then be used to calculate the return period wind speed, to provide a more accurate estimate than just using the measured wind speeds alone.

Method 200 starts at step 201, at which wind speed measurements associated with the proposed wind turbine site are provided. The wind speed measurements are real data, measured at or near the proposed site during a measurement period. For example, wind measurements may be taken from a location sufficiently close to the proposed site to experience the same weather/wind speed characteristics or variations (e.g. within 5 km or 1 km of the proposed site). The wind speed measurements may comprise measurements with a sampling rate of (approximately) one measurement per 5-30 minutes, or 5-15 minutes, or in a particular embodiment, 10 minutes. Measuring the wind speeds may comprise determining an average (e.g mean) wind speed over the sampling period. For example, each measurement in the set of wind speed measurements may be a 10-minute average. The measurement period may for example be between 6 months and 2 years.

The local measurements used for the wind speed measurements may be performed by a sensor on a mast at a mast height. The mast height may correspond to an expected height of the wind turbine/s proposed to be built at the site. Similarly, the modeled wind speeds discussed in step 203 below may be modeled for the same mast height.

At step 202, the wind speed measurements are transformed into a frequency domain to generate a measured wind speed spectrum. This may comprise applying a Fourier transform, for example using a fast Fourier transform (FFT) algorithm. Transforming the wind speeds may particularly comprise calculating a power spectral density of the wind speeds.

At step 203, a set of modeled wind speeds are provided. The modeled wind speeds are estimates of wind speeds at the proposed wind turbine site during an extended period. The extended period is longer than the measurement period of the measured wind speeds, and in particular embodiments may encompass the measurement period (i.e. modeled wind speeds may be provided for times corresponding to the measurement period of the locally measured wind speeds). The extended period may for example be between 10 and 30 years.

As discussed above, the modeled wind speeds may be determined using a mesoscale model. The mesoscale model may be generated using non-local sensor measurements. Thus in such embodiments, all the wind speeds used in the steps below incorporate real world measurements at either the local or non-local level, and so may be a more accurate a representation of wind speeds at the proposed site than purely modeled data.

The modeled wind speeds may have a lower sampling rate than the measured wind speed. For example, the rate may be one modeled wind speed per 30-90 minute period, or in a particular embodiment, 60 minutes. As with the measured wind speeds, the modeled wind speeds may represent the average wind speed over a sampling period, such as a 60-minute average.

At step 204, the modeled wind speeds are transformed into the frequency domain to generate a modeled wind speed spectrum. The transformation is similar to that of the measured wind speeds in step 202.

At step 205, the measured wind speed spectrum and the modeled wind speed spectrum are combined to generate a hybrid spectrum. For example, a portion of the modeled wind speed spectrum may be joined to a portion of the measured wind speed spectrum; or the two spectra (or portions thereof) may be averaged to form the hybrid spectrum.

Figure 3:
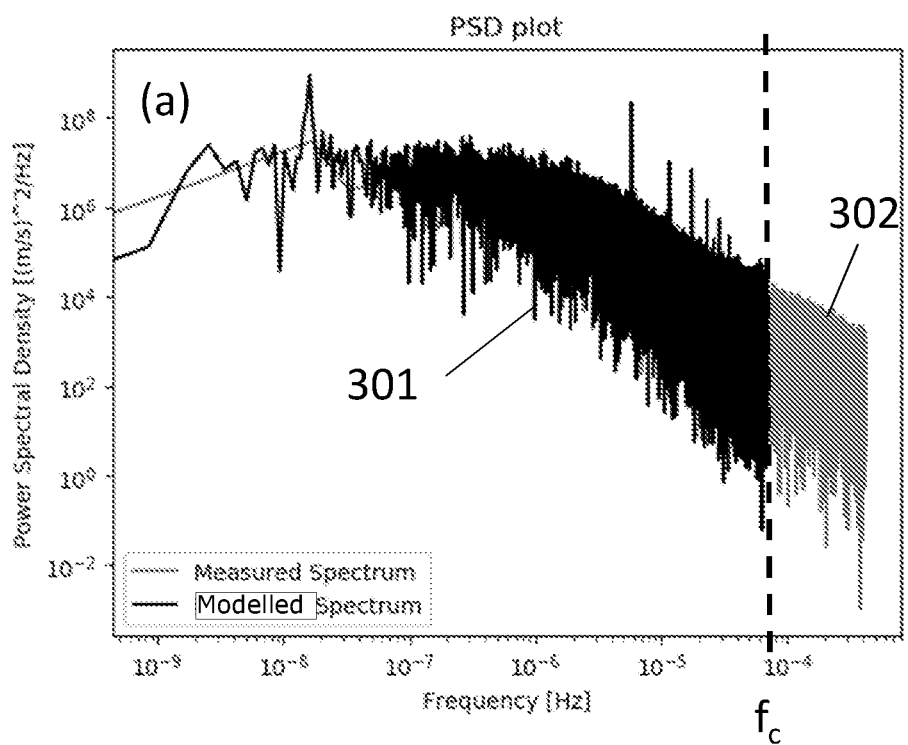
FIG. 3 shows an example of a hybrid spectrum generated by the method of FIG. 2.
Figure 3:
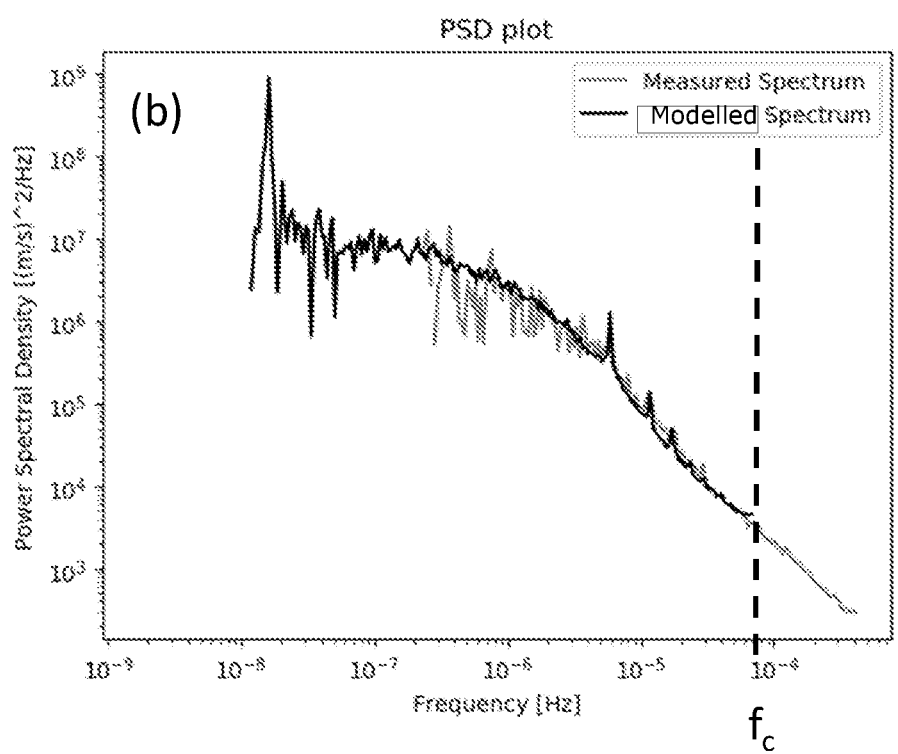

In particular embodiments, the hybrid spectrum may be formed by joining a low-frequency portion of the modeled spectrum with a high frequency portion of the measured spectrum. FIG. 3(a) shows an example of how such a hybrid spectrum is generated. A first portion 301 is extracted from the modeled wind speed spectrum, the first portion extending up to a cut-out frequency, $f_c$. The first portion 301 is joined to a second portion 302 from the measured wind speed spectrum, the second portion being the portion of the measured wind speed spectrum above the cut-out frequency, $f_c$. It is noted that in FIGS. 3(a) and 3(b), the measured spectrum below the cut-out frequency, $f_c$, is also shown. However, this section of the measured spectrum is not used in forming the hybrid spectrum. The modeled spectrum used in these figures is derived from a mesoscale model, as described above.

The cut-out frequency, $f_c$, may be determined on a case-by-case basis to best suit the measured and modeled spectra. In particular, the cut out frequency, $f_c$, may be determined as the point at which the modeled spectrum deviates from the measured spectrum (i.e. the modeled spectrum shows a difference from the measured spectrum that increases at higher frequencies). This step may be performed after smoothing the spectra.

However, it has been found that the ultimate return period wind speed result shows very little dependence on the choice of cut-out frequency. Thus a predetermined cut-out frequency may be used. In particular, the cut-out frequency may be a predetermined value in the range $10^{-5}$ to $10^{-4}$ Hz, or preferably $3\times10^{-5}$ to $5\times10^{-5}$ Hz. In the example shown in FIG. 3(a), a cut-out frequency of $3.7\times10^{-5}$ Hz has been used.

The first and second portions 301, 302 may comprise all of the relevant modeled/measured spectrum below/above the cut-out frequency $f_c$. Alternatively, the low frequency end of the first portion 301 and/or the high frequency end of the second portion may be omitted (e.g. the spectra may be windowed before the combination step).

As shown in FIG. 3(b), the measured and modeled spectra, and/or the hybrid spectrum resulting from their combination, may be smoothed using any known data smoothing algorithm to generate the smoothed hybrid spectrum 303, which may be used in place of the hybrid spectrum 300 in the steps described below.

Returning to method 200 shown in FIG. 2, after forming the hybrid spectrum, the method 200 proceeds to step 206. At step 206, the hybrid spectrum is transformed from the frequency domain into a time domain to provide hybrid wind speed measurements. For example, an inverse Fourier transform may be applied to the hybrid spectrum.

Transforming the hybrid spectrum may comprise deconvoluting the hybrid spectrum. For, example in cases where the original transformations of the modeled and measured wind speeds comprised calculating the power spectral density, the following calculation may be used to deconvolute the hybrid spectrum:

A sampling frequency $f_{s-HS}$ of the hybrid spectrum HS(t) may be determined (which in this case equals the sampling rate of the measured wind speeds). An amplitude function of the spectrum A(f) may then be calculated as $A(f)= \sqrt{2\times HS(f)\times f_{s-HS}}$. A random phase function φ(f) may be determined (as phase information was lost in the formation of the power spectral density), where φ(f)=random,uniform ∈ [0,2π]. The hybrid time series H(t) may then be computed as H(t)=iFFT(Z(f)), where $Z(f)=A(f)\times e^{i\times\varphi(f)}$.

It is noted that the length of the hybrid time series will be half the length of the set of modeled wind speeds, due to the effects of the Nyquist frequency.

In some embodiments, the wind speeds of the hybrid time series may be scaled to account for loss of amplitude information in the transformation/de-transformation process. The scaled hybrid time series is then used in place of the hybrid time series in step 207 below. For example, the amplitude of the hybrid time series may be scaled based on the standard deviation of wind speeds in the measured wind speed time series, σ(Measured). In particular, a scaled hybrid time series $H_s(t)$ may be calculated as:

$$H_s(t) = H(t) \times \frac{\sigma(\text{Measured})}{\sigma(H(t))},$$

where σ(H(t)) is the standard deviation of the un-scaled hybrid time series. It is to be noted that other statistical measurements of spread or variation may be used in place of standard deviation. Scaling the hybrid time series in this way may make the hybrid wind measurements more representative of the actual wind conditions at the proposed turbine site.

At step 207 of method 200, the hybrid time series formed in step 206 is used to calculate the return period wind speed.

For example, the hybrid time series may be used instead of the measured wind speeds in the Gumbel method of calculating extreme wind speeds, such as the 50 year wind speed $V_{ref50}$ (e.g. using the method shown in FIG. 1). The return period of the return period wind speed may for example be between 30 and 100 years.

In embodiments where a random phase value φ(f) is used in the generation of the hybrid time series, the return period wind speed calculated at step 206 may be dependent upon the choice of phase value. To limit this effect, steps 205 and 206 may in some embodiments be repeated a plurality of times (e.g. 1000 or more times), each time using a different random phase value to calculate the hybrid time series and resulting return period wind speed. The plurality of return period wind speeds thus formed may be averaged to yield a final value for the return period wind speed. Alternatively, the highest return period wind speed calculated may be taken as the final value for the return period wind speed. The set of calculated return period wind speeds may also be used to provide an uncertainty value on the final value used for the return period wind speed.

The hybrid time series formed by method 200 is not simply a long term corrected version of the measured data with respect to the modeled data. Instead, it is a time series which has the characteristics of the both the modeled data and the measured data. In particular, the hybrid time series will have the high sampling rate of the measured data, but a duration based on the long duration of the modeled data. As a result, the return period wind speed calculated according to method 200 benefits from real, locally measured data, but does not have the inaccuracies of extrapolating a limited measured data set to periods of 50 years or more.

The method 200 further benefits from limited dependence on anomalous values. Isolated very high wind speeds in the measured or modeled data, for example due to an error, will not be represented in the measured/modeled spectra—as the frequency associated with such one-off values will be negligible. Similarly, if the measured or modeled data contain an extreme wind value, for example a 200-year wind speed, the method 200 will limit its impact and so avoid over-estimation of the return period wind speed. As discussed above, the method 200 also benefits from a limited sensitivity to the choice of cut-out frequency, limiting the scope for error. Further, the method 200 is not sensitive to uncleaned or unfiltered measurements, unlike conventional methods of calculating extreme wind speeds.

The return period wind speed calculated by method 200 may be used to decide whether to site a wind turbine at the proposed site, or to determine a design parameter of a wind turbine at the proposed site. The design parameter may for example be at least one of a construction material, a tower strength, a tower thickness, a blade strength, and a foundation depth. For example, if it is determined than a wind turbine at the site would experience relatively high wind speeds, the design of the wind turbine may be altered to increase its strength, by altering one or more of its design parameters.

Figure 4:
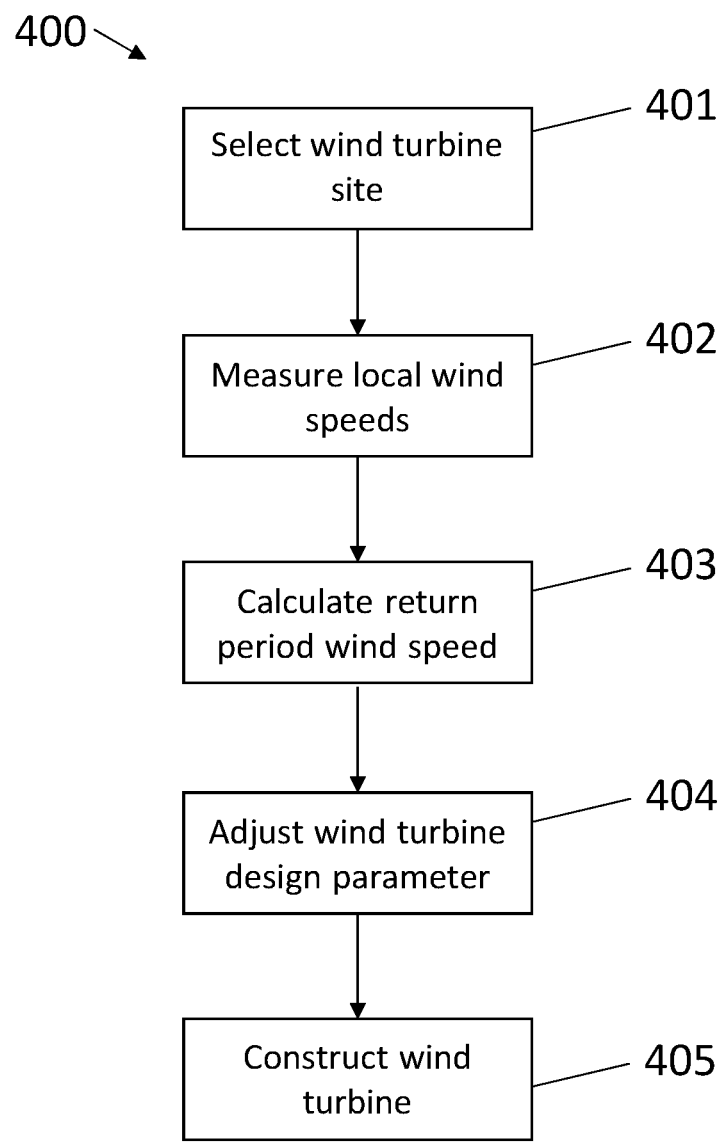
FIG. 4 illustrates a method of designing a wind turbine based on the calculated extreme wind speed associated with the return period.

FIG. 4 illustrates how the method 200 can be incorporated into a method 400 of designing and constructing a wind turbine.

Method 400 starts at step 401, at which a proposed wind turbine site at which the wind turbine is to be located is selected.

At step 402, one or more wind speed sensors are used to measure wind speeds at the proposed wind turbine site during a measurement period. Alternatively previously measured local wind speeds may be provided.

At step 403, the measured wind speeds are used in conjunction with modeled wind speeds (e.g. from a mesoscale model) to calculate a return period wind speed for the proposed wind turbine, using the method 200 described above.

At step 404, a design parameter of the wind turbine is adjusted based on the return period wind speed. The design parameter may for example be at least one of a construction material, a tower strength, a tower thickness, a blade strength, and a foundation depth.

The method 400 may then proceed to step 405, at which a wind turbine is constructed in accordance with the design parameter.

Although the invention has been described above with reference to one or more preferred embodiments, it will be appreciated that various changes or modifications may be made without departing from the scope of the invention as defined in the appended claims.

The invention claimed is:

1. A method of calculating a return period wind speed for a proposed wind turbine site, the method comprising:
   providing wind speed measurements associated with the proposed wind turbine site, the wind speed measurements measured during a measurement period;
   transforming the wind speed measurements into a frequency domain to generate a measured wind speed spectrum;
   providing modelled wind speeds, wherein the modelled wind speeds are estimates of wind speeds at the proposed wind turbine site during an extended period, the extended period being longer than the measurement period;
   transforming the modelled wind speeds into the frequency domain to generate a modelled wind speed spectrum;
   combining the measured wind speed spectrum and the modelled wind speed spectrum to generate a hybrid spectrum;
   transforming the hybrid spectrum from the frequency domain into a time domain to provide hybrid wind speed measurements; and
   calculating the return period wind speed using the hybrid wind speed measurements.

2. The method of claim 1, wherein the extended period encompasses the measurement period.

3. The method of claim 1, wherein combining the measured wind speed spectrum and the modelled wind speed spectrum comprises:
   extracting a portion of the modelled wind speed spectrum with frequencies up to a cut-out frequency; and
   extracting a portion of the measured wind speed spectrum with frequencies above the cut-out frequency; and
   combining the portion of the modelled wind speed spectrum with the portion of the measured wind speed spectrum to generate the hybrid spectrum.

4. The method of claim 3, wherein the cut-out frequency is a predetermined value.

5. The method of claim 1, wherein calculating the return period wind speed using the hybrid wind speed measurements comprises:
   scaling the hybrid wind speed measurements based on a statistical deviation of the wind speed measurements to generate scaled hybrid wind speed measurements; and
   calculating the return period wind speed using the scaled hybrid wind speed measurements.

6. The method of claim 1, wherein transforming the hybrid spectrum from the frequency domain into the time domain is based on a random phase value, and wherein the method comprises:
- generating a plurality of sets of hybrid wind speed measurements, each set of hybrid wind speed measurements based on a different random phase value;
- calculating a return period wind speed for each set of hybrid wind speed measurements in the plurality of sets of hybrid wind measurements; and
- averaging the calculated return period wind speeds.

7. The method of claim 1, wherein transforming the wind speed measurements and/or modelled wind speeds into the frequency domain comprises calculating a power spectral density of the wind speed measurements and/or modelled wind speeds.

8. The method of claim 1, wherein the wind speed measurements are measured at a mast height, and wherein the modelled wind speeds are estimates of wind speeds at the mast height.

9. The method of claim 1, wherein the measurement period is between 6 months and 2 years.

10. The method of claim 1, wherein the extended period is between 10 years and 30 years.

11. The method of claim 1, wherein the return period of the return period wind speed is between 30 years and 75 years.

12. The method of claim 1, wherein providing the wind speed measurements comprises measuring the wind speed at the proposed wind turbine site using one or more wind speed sensors.

13. The method of claim 1, wherein the modelled wind speeds are generated using a mesoscale model.

14. The method of claim 1, wherein calculating the return period wind speed comprises applying a Gumbel calculation to the hybrid wind speed measurements.

15. The method of claim 1, further comprising altering a design parameter of a wind turbine to be built at the proposed wind turbine site based on the calculated wind speed associated with the return period.

16. A method of designing a wind turbine, the method comprising:
- selecting a proposed wind turbine site at which the wind turbine is to be located;
- using one or more wind speed sensors, measuring wind speeds associated with the proposed wind turbine site during a measurement period;
- performing an operation to calculate a wind speed associated with a return period for the proposed wind turbine, the operation, comprising:
- providing wind speed measurements associated with the proposed wind turbine site, the wind speed measurements measured during a measurement period;
- transforming the wind speed measurements into a frequency domain to generate a measured wind speed spectrum;
- providing modelled wind speeds, wherein the modelled wind speeds are estimates of wind speeds at the proposed wind turbine site during an extended period, the extended period being longer than the measurement period;
- transforming the modelled wind speeds into the frequency domain to generate a modelled wind speed spectrum;
- combining the measured wind speed spectrum and the modelled wind speed spectrum to generate a hybrid spectrum;
- transforming the hybrid spectrum from the frequency domain into a time domain to provide hybrid wind speed measurements; and
- calculating a return period wind speed using the hybrid wind speed measurements; and
- altering a design parameter of the wind turbine based on the wind speed associated with the return period.

17. A method of constructing a wind turbine, the method comprising:
- selecting a proposed wind turbine site at which the wind turbine is to be located;
- using one or more wind speed sensors, measuring wind speeds at the proposed wind turbine site during a measurement period;
- performing an operation to calculate a wind speed associated with a return period for the wind turbine, the operation, comprising:
- providing wind speed measurements associated with the proposed wind turbine site, the wind speed measurements measured during a measurement period;
- transforming the wind speed measurements into a frequency domain to generate a measured wind speed spectrum;
- providing modelled wind speeds, wherein the modelled wind speeds are estimates of wind speeds at the proposed wind turbine site during an extended period, the extended period being longer than the measurement period;
- transforming the modelled wind speeds into the frequency domain to generate a modelled wind speed spectrum;
- combining the measured wind speed spectrum and the modelled wind speed spectrum to generate a hybrid spectrum;
- transforming the hybrid spectrum from the frequency domain into a time domain to provide hybrid wind speed measurements; and
- calculating a return period wind speed using the hybrid wind speed measurements;
- altering a design parameter of the wind turbine based on the wind speed associated with the return period; and
- constructing the wind turbine based on the design parameter.

* * * * *